United States Patent [19]

Nakagawa et al.

[11] Patent Number: 5,309,308
[45] Date of Patent: May 3, 1994

[54] CASSETTE-DETECTION DEVICE FOR USE IN MAGNETIC TAPE APPARATUSES

[75] Inventors: Kouji Nakagawa; Masafumi Kurata; Hideo Yoshida, all of Higashihiroshima, Japan

[73] Assignee: Sharp Kabushiki Kaisha, Osaka, Japan

[21] Appl. No.: 6,981

[22] Filed: Jan. 21, 1993

[30] Foreign Application Priority Data

Mar. 18, 1992 [JP] Japan ................................. 4-62474

[51] Int. Cl.$^5$ .............................................. G11B 15/02
[52] U.S. Cl. .................................................... 360/137
[58] Field of Search ............... 360/137, 94, 96.5, 96.6, 360/69

[56] References Cited

U.S. PATENT DOCUMENTS

| | | | |
|---|---|---|---|
| 5,016,123 | 5/1991 | Karsh | 360/69 |
| 5,172,284 | 12/1992 | Ohshima | 360/94 |
| 5,231,553 | 7/1993 | Weber et al. | 360/94 |

FOREIGN PATENT DOCUMENTS

| | | |
|---|---|---|
| 0311390 | 4/1989 | European Pat. Off. . |
| 0335271 | 10/1989 | European Pat. Off. . |
| 0452149 | 10/1991 | European Pat. Off. . |
| 57-183648 | 12/1982 | Japan . |
| 63-71970 | 1/1988 | Japan . |
| 2-263345 | 10/1990 | Japan . |
| 4-21954 | 1/1992 | Japan . |

*Primary Examiner*—Robert S. Tupper
*Attorney, Agent, or Firm*—Nixon & Vanderhye

[57] ABSTRACT

A cassette-detection device for use in magnetic tape apparatuses which is provided with a first detection means for detecting the difference in thickness between a cartridge and a cassette shell in order to judge which cassette tape is loaded, an analog cassette tape or a digital cassette tape, and a second detection means for detecting the recessed section of the cartridge of an analog cassette tape in order to judge which side is up with respect to the analog cassette tape. In accordance with the above arrangement, by providing a simple structure, judgement is made as to which cassette tape is loaded, an analog cassette tape or a digital cassette tape, and judgement is also made as to which side is up when an analog cassette tape is loaded.

10 Claims, 8 Drawing Sheets

CASSETTE-DETECTION DEVICE FOR USE IN MAGNETIC TAPE APPARATUSES

FIELD OF THE INVENTION

The present invention relates to a cassette-detection device for use in magnetic tape apparatuses which can handle both analog compact cassette tapes and digital compact cassette tapes. In the analog compact cassette tapes, information is recorded and reproduced using an analog signal, while in the digital compact cassette tapes, information is recorded and reproduced using a digital signal.

BACKGROUND OF THE INVENTION

Recently, such tape recorders which can handle both the analog compact cassette tapes (hereinafter, referred to simply as C-cassettes) and digital compact cassette tapes (hereinafter, referred to simply as D-cassettes) have come to be known in the art. In the C-cassettes, information is recorded and reproduced using an analog signal, while in the D-cassettes, information is recorded and reproduced using a digital signal.

The shapes of the C-cassettes and D-cassettes used in such tape recorders are described as follows.

As illustrated in explanatory drawings, FIGS. 2(a) and (b), a C-cassette 1 is composed of a cassette-half of A-side (hereinafter, referred to as "A-side 2"), a cassette-half of B-side (hereinafter, referred to as "B-side 3"), and a magnetic tape, not shown.

Figure 3:
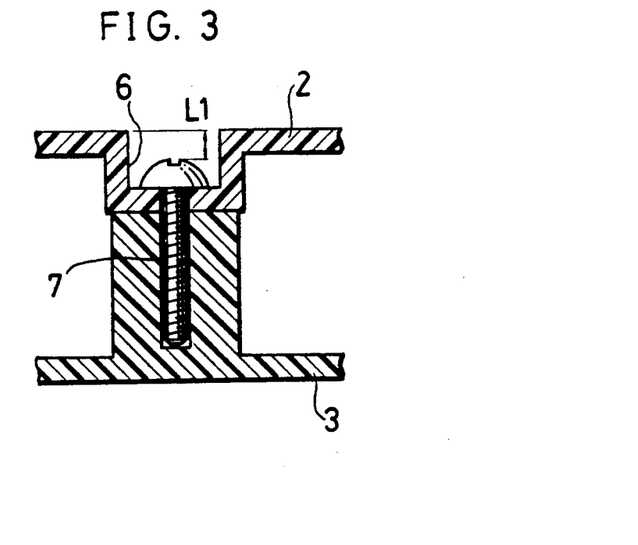
FIG. 3 is a vertical sectional view showing a machine-screw hole that is formed in the A-side of the C-cassette.
Figure 4A:
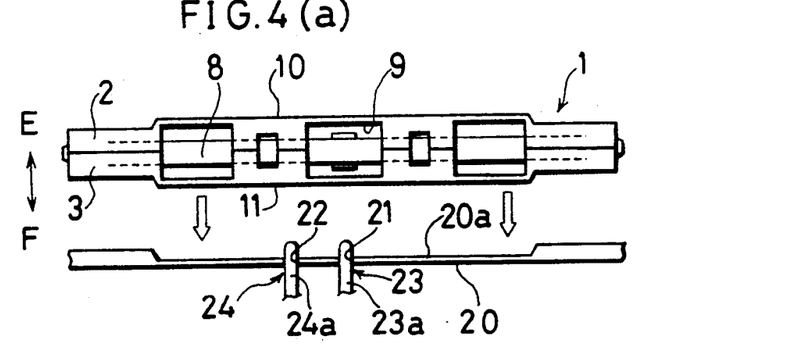
FIG. 4(a) is a front view.
Figure 4B:
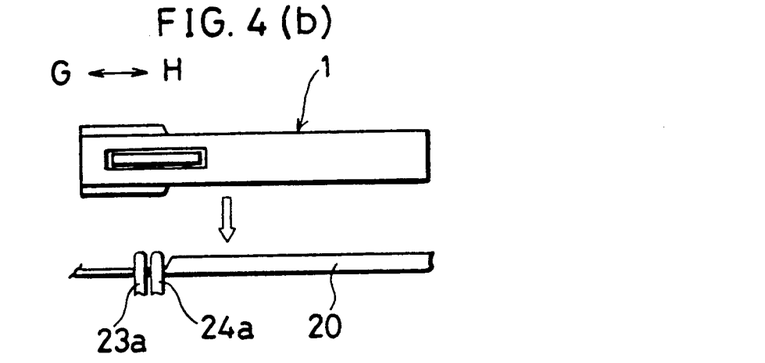
FIG. 4(b) is a right side view.

On the A-side 2, a machine-screw hole 6 is provided in the center of a raised portion 10, which will be described later. Through the machine-screw hole 6, a machine screw 7 puts together the A-side 2 and the B-side 3. As illustrated in FIG. 3, the machine screw does not penetrate through the surface of the B-side 3. Further, as illustrated in FIGS. 4 (a) and (b), the C-cassette 1 is provided on both sides with raised portions 10 and 11, each of which is formed with a trapezoid-like shape as seen from its cross section. Here, both of the A-side 2 and the B-side 3 of the C-cassette 1 are made of a non-conductive resin.

The C-cassette 1 contains a magnetic tape 8 which has two upper and lower tracks formed thereon. When the C-cassette 1 is loaded in a tape recorder with the A-side 2 seen by the user, recording and reproducing are executed on and from the lower track in the forward mode. On the other hand, in the reverse mode recording and reproducing are executed on and from the upper track.

Figure 6A:
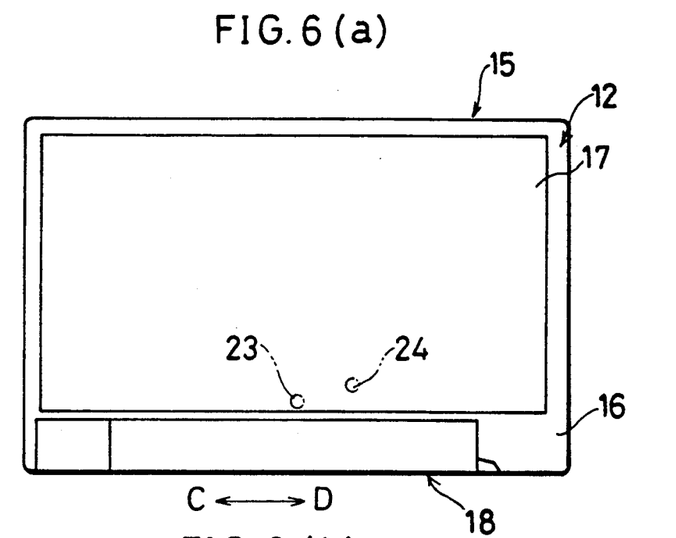
FIG. 6(a) is a plan view.
Figure 6B:
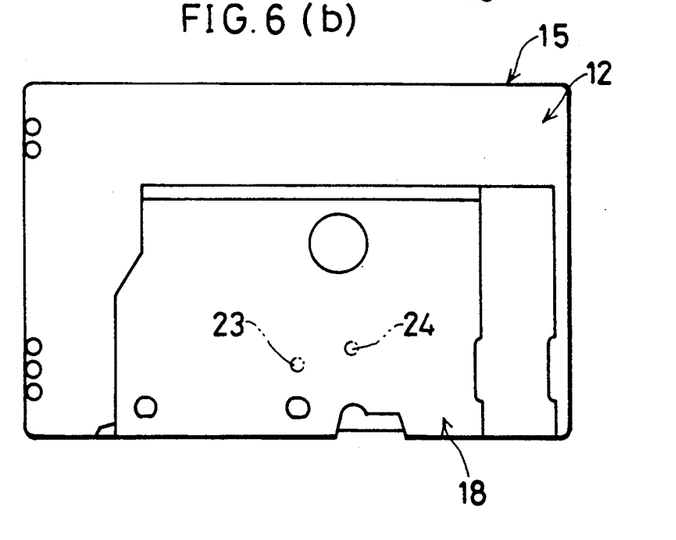
FIG. 6(b) is a bottom view.

Conversely, as illustrated in FIGS. 6(a) and (b), a D-cassette 15 is provided with a cassette shell 12 made of a non-conductive material. On a surface 16 of the cassette shell 12, a paper label 17 is adhered so that it covers most of the surface thereof. This D-cassette 15 is normally loaded in a tape recorder with the label 17 side up as seen by the user; therefore, in most cases, the D-cassette 15 does not have the definition of A-side and B-side. If the D-cassette 15 is loaded with the label down as seen by the user, it is misloaded.

Figures 7A, 7B:
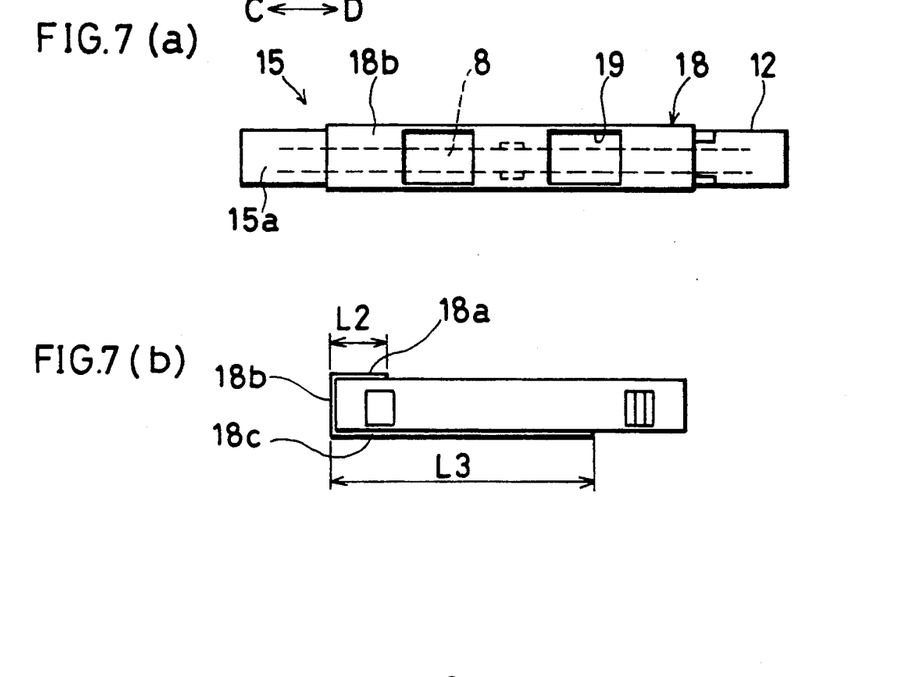
FIG. 7(a) is a front view.
FIG. 7(b) is a right side view.

Further, the D-cassette 15 differs from the C-cassette 1 in that it is provided with a slider 18 made of a metallic material, which reciprocally moves and slides in the directions indicated by arrows C–D at the front portion of the D-cassette 15. As illustrated in FIGS. 7(a) and (b), the slider 18 is constituted of an upper bent portion 18a, a slider front portion 18b and a lower bent portion 18c, virtually forming a U-shape. The depth dimension L2 of the upper bent portion 18a is shorter than the depth dimension L3 of the lower bent portion 18c. Here, in the cassette shell 12 of the D-cassette 15, there is no machine-screw hole and no machine-screw is used.

The D-cassette 15 contains a magnetic tape 8 which has two upper and lower tracks as in the C-cassette 1; yet, the track closer to the surface 16 is used in the forward mode and the other track further therefrom is used in the reverse mode, which makes it different from the C-cassette 1. Therefore, in the case of the D-cassette 15, unless the user improperly loads the cassette, recording and reproducing are executed on and from the track in the forward mode when the user specifies the forward mode, and are executed on and from the track in the reverse mode when the user specifies the reverse mode.

In such magnetic tape apparatuses, in the case of recording or reproducing the C-cassette 1 in the automatic reversing mode, if it is loaded in the apparatus with the A-side 2 up, recording or reproducing is executed on or from the predetermined track in the forward mode or the reverse mode with respect to the A-side 2. However, if it is loaded in the apparatus with B-side 3 up, recording or reproducing is also executed on or from the predetermined track in the forward mode or the reverse mode with respect to the B-side 3. Thus, the forward-use track of the A-side 2 coincides with the reverse-use track of the B-side 3, while the reverse-use track of the A-side 2 coincides with the forward-use track of the B-side 3. Therefore, the user may become confused unless he or she takes notice of the side of the C-cassette 1 to be loaded in the apparatus. However, in most of the car-use tape recorders and portable tape recorders, it is difficult to confirm which side is on with respect to the cassette that has been loaded.

In order to solve the above problems, such systems have been developed; for example, Japanese Examined Patent Publication No. 3-55896 (55896/1991) discloses a system wherein judgement is made as to which side is up by providing a means for detecting a machine screw hole 6 or a machine screw 7 on the A-side 2 in the C-cassette 1 and the necessary operation is carried out based on the results of the judgement.

In the case of the D-cassette 15, generally, the tape recorder main body is provided with an appropriate function in order to avoid misloading. More specifically, if the D-cassette 15 is misloaded, the main body will not be able to find a recessed section for use in opening and closing of the slider at a predetermined position and thus the member for opening and closing the slider will not be able to make a proper action, thereby indicating a misloading.

Moreover, as to which cassette is loaded, C-cassette 1 or D-cassette 15, since the C-cassette 1 does not have a recessed section for use in opening and closing of the slider, which is provided in the D-cassette 15, the detection is made as to which kind of cassette is loaded by utilizing the difference of the travelling distance of the member for opening and closing the slider, or the detection is made by using switches or other devices by utilizing the difference of shapes between the C-cassette 1 and the D-cassette 15.

As described above, in a tape recorder that can handle the recording and reproducing functions thereon and therefrom of both the C-cassette 1 and the D-cassette 15, it is necessary to provide means to meet the following requirements:
(1) the ability to detect which cassette is loaded, C-cassette or D-cassette.
(2) the ability to judge which side of the cassette facing up in the case of recording or reproducing information on or from the C-cassette 1 in the automatic reversing mode.
(3) the ability to prevent misloading of the D-cassette 15 or to detect a misloaded D-cassette 15.

However, conventional cassette-detection devices for use in magnetic tape apparatuses, although they are provided with means for handling the above requirements individually, have not succeeded in satisfying all the requirements by the use of simple means.

More specifically, for example, it is extremely difficult to simultaneously satisfy the requirements (1) and (3) by utilizing the member for opening and closing the slider 18, and it is inevitable that a complicated structure is needed to satisfy all these requirements.

Further, if all the requirements (1), (2) and (3) are to be satisfied by providing proper electric circuits, switches or other devices that meet the respective requirements should be installed, resulting in the necessity of complicated wiring.

SUMMARY OF THE INVENTION

It is an object of the present invention to provide a cassette-detection device for use in magnetic tape apparatuses that can judge which cassette tape is loaded, an analog cassette tape or a digital cassette tape, as well as judge which side of the cartridge is up when an analog cassette tape is loaded.

In order to achieve the above objectives, the present invention is provided with a first detection means for detecting the thickness of a cartridge in order to judge which cassette tape is loaded, an analog cassette tape or a digital cassette tape, and a second detection means for detecting the recessed section of a cartridge of an analog cassette tape in order to judge which side is up with respect to the analog cassette tape.

In accordance with the above arrangement, without the necessity of a complicated device, judgement is made as to which cassette tape is loaded, an analog cassette tape or a digital cassette tape, and judgement is also made as to which side of the cartridge is up when an analog cassette tape is loaded.

For a fuller understanding of the nature and advantages of the invention, reference should be made to the ensuing detailed description taken in conjunction with the accompanying drawings.

BRIEF DESCRIPTION OF THE DRAWING

FIGS. 1 through 11 show one embodiment of the present invention.

FIG. 1 shows a cassette-detection device for use in a tape recorder of the present invention, wherein

FIG. 2 shows the C-cassette to be loaded into the tape recorder, wherein

FIG. 4 shows a state where the C-cassette is loaded into the tape recorder, wherein

FIG. 5 is an enlarged view of FIG. 4, wherein FIG. 5(a) is a front view; and FIG. 5(b) is a right side view.

FIG. 6 shows the D-cassette loaded into the tape recorder, wherein

FIG. 7 shows a state where a slider 18 of the D-cassette is closed, wherein

FIG. 8 shows a state where the D-cassette is loaded into the tape recorder with the slider 18 opened, wherein

FIG. 9 is an enlarged view of FIG. 8, wherein

FIG. 10 shows a switch for use in the cassette-detection device, wherein

DESCRIPTION OF THE EMBODIMENTS

Referring to FIGS. 1 through 11, the following description will discuss one embodiment of the present invention.

A cassette tape recorder with an automatic reversing system (hereinafter, referred to as tape recorder) of the present embodiment, which is one of the magnetic tape apparatuses, can handle both of the C-cassette (analog compact cassette tape) as a first cassette and the D-cassette (digital compact cassette tape) as a second cassette. Here, in the C-cassettes, information is recorded and reproduced using an analog signal, while in the D-cassettes, information is recorded and reproduced using a digital signal.

The shapes of the C-cassette and D-cassette are described as follows.

Figure 2A:
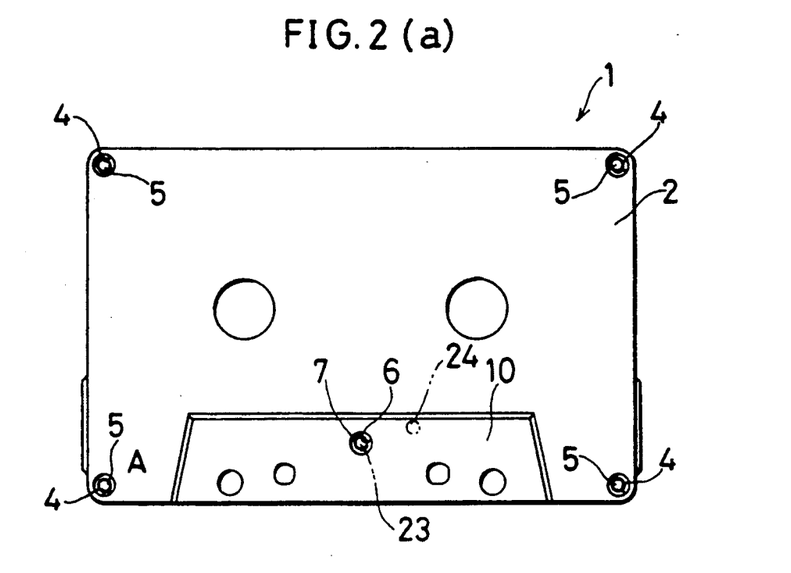
FIG. 2(a) is a plan view.
Figure 2B:
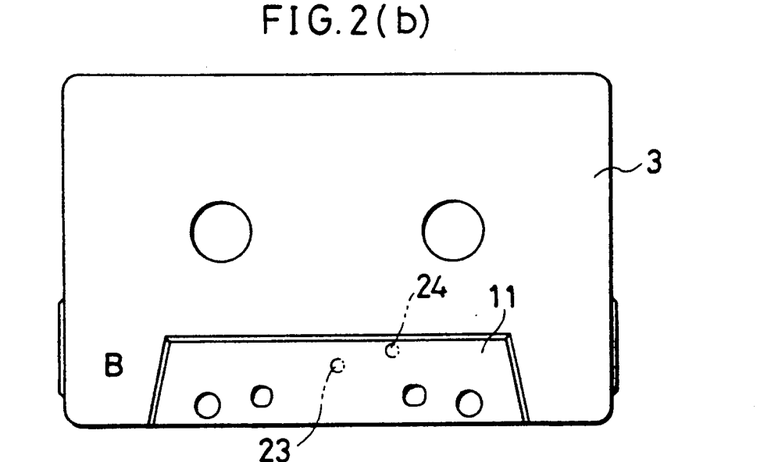
FIG. 2(b) is a bottom view.

As illustrated in explanatory drawings, FIGS. 2(a) and (b), a C-cassette 1 is composed of an A-side 2 (a cassette-half labeled as A-side), a B-side 3 (a cassette-half labeled as B-side), and a magnetic tape, not shown. Here, two upper and lower cassette halves constitute a cartridge.

On the A-side 2, tapered-screw holes 4 are provided in the four corners thereof, and a machine-screw hole 6 (providing a recessed section) used as a fixing hole, which will be described later, is provided in the center of the raised portion 10. Through these holes, tapered screws 5 and a machine screw 7 hold together the A-side 2 and the B-side 3. As illustrated in FIG. 3, the machine screw does not penetrate through the surface of the B-side 3. Further, the top of the machine screw 7 is invariably situated at a recessed position lower than the outermost surface of the A-side 2, thereby providing a depth dimension L1.

As shown in FIGS. 4(a) and 4(b), the C-cassette 1 has an opening 9 through which a magnetic head, not shown, can access the magnetic tape 8. The C-cassette 1 is provided on both the flat surfaces of the A-side 2 and the B-side 3 with respective raised portions 10 and 11, which form the front portion wherein the opening 9 is installed. Each of the raised portions 10 and 11 has a trapezoid-like shape in its cross section, and the A-side 2 and the B-side 3 of the C cassette 1 are made of a non-conductive resin.

The C-cassette 1 contains the magnetic tape 8 which has two upper and lower tracks formed thereon. When the C-cassette 1 is loaded in a tape recorder with the A-side 2 seen by the user, recording and reproducing are executed on and from the lower track in the forward mode. On the other hand, in the reverse mode, recording and reproducing are executed on and from the upper track. In addition, in the case of a tape recorder having only the one-way mode, when the C-cassette 1 is loaded in the tape recorder with the A-side 2 seen by the user, recording and reproducing are executed on and from the lower track that is associated with the A-side 2.

On the other hand, as illustrated in FIG. 6, a D-cassette 15 is provided with a cassette shell 12 having a rectangular parallelepiped shape, which has the same standard central values as the C-cassette 1 in its width and depth. However, the cassette shell 12 has a thickness which is thinner than the thickness of the C-cassette 1 including the raised portions 10 and 11 in its vertical direction, but is thicker than the C-cassette 1 excluding the raised portions 10 and 11.

As illustrated in FIGS. 6(a) and (b), on the D-cassette 15, the label 17 of paper or other materials is adhered to only one surface 16 of the cassette shell 12; in most cases, the D-cassette 15 does not have the definition of A-side and B-side. This is because the D-cassette 15 is always loaded with the surface 16 having the label 17 up as seen by the user (hereinafter, referred to as "proper-loading"). If the D-cassette 15 is loaded upside down, it is misloaded.

Further, the D-cassette 15 differs from the C-cassette 1 in that it is provided with a slider 18 made of a metallic material as an electrically conductive material. As illustrated in FIGS. 7(a) and (b), the slider 18 is constituted of an upper bent portion 18a, a slider front portion 18b and a lower bent portion 18c, virtually forming a U-shape. The lower bent portion 18c is longer than the upper bent portion 18a; the relationship between the depth dimension L2 of the upper bent portion 18a and the depth dimension L3 of the lower bent portion 18c is defined as $L2 \ll L3$.

Figures 1A, 1B:
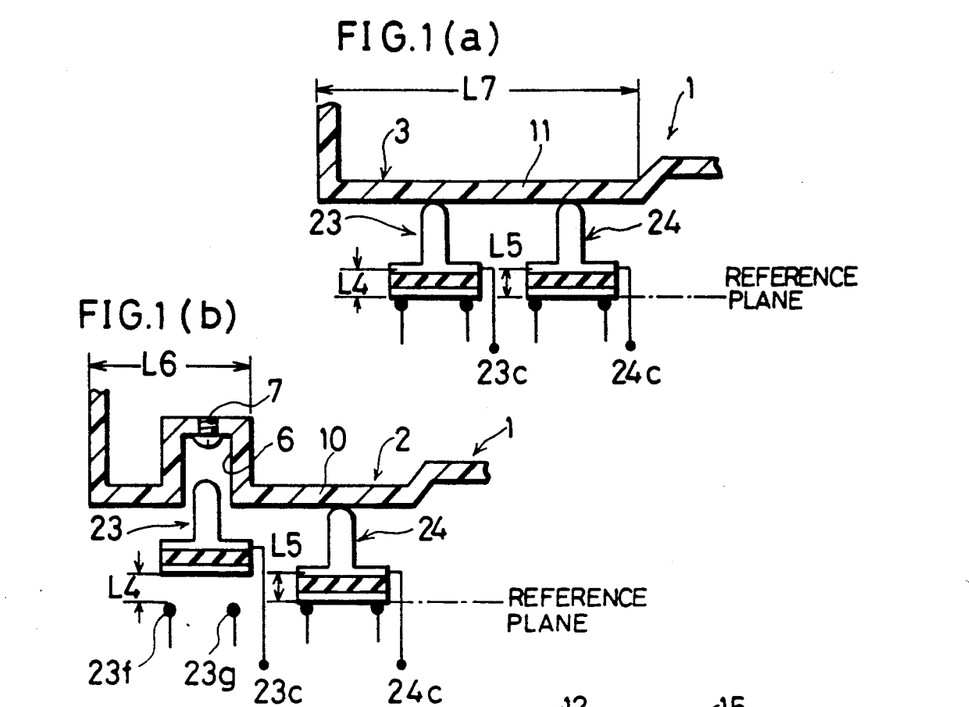
FIG. 1(a) is a sectional side view showing a state where an analog compact cassette (C-cassette) is loaded with its B-side downward.
FIG. 1(b) is a sectional side view showing a state where the C-cassette is loaded with its A-side downward.

As to the positional relationships between members of the D-cassette 15 and those of the C-cassette 1 with respect to the upper bent portion 18a, the depth dimension L2 is shorter than the distance L6 that is from the front edge to the machine-screw hole 6 of the C-cassette 1 as is illustrated in FIG. 1(b).

Figures 8A, 8B:
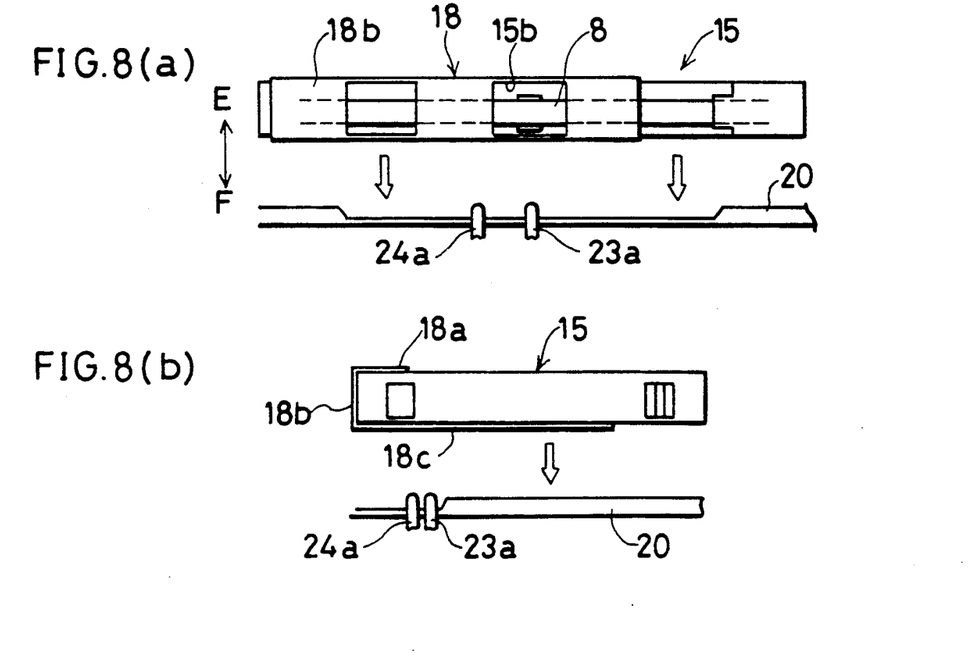
FIG. 8(a) is a front view.
FIG. 8(b) is a right side view.

Further, the slider 18 is arranged to reciprocally move and slide in the directions indicated by arrows C-D at the front portion of the D-cassette 15. A slider opening 19 is provided at the slider front portion 18b of the slider 18, and a slider opening and closing member, not shown, is inserted into a hole formed at the end portion of the slider front portion 18b, thereby moving the slider 18 in the C-direction. Thus, as shown in FIGS. 8(a) and (b), a D-cassette opening 15b formed at the front portion 15a of the D-cassette 15 is aligned face to face with the slider opening 19 in such a manner that the magnetic tape 8 is exposed, thereby allowing the magnetic head, not shown, to access it.

Additionally, the D-cassette 15, which is made of a non-conductive resin except the slider 18, is electrically non-conductive including the label made of paper or another material. Here, in the cassette shell 12 of the D-cassette 15, there is no machine-screw hole and no machine-screw is used.

The magnetic tape 8 has two upper and lower tracks as in the C-cassette 1; yet, the track closer to the surface 16 is used in the forward mode and the other track further therefrom is used in the reverse mode, which makes it different from the C-cassette 1. Therefore, in the case of the D-cassette 15, unless the user improperly loads the cassette, recording and reproducing are executed on and from the track in the forward mode when the user specifies the forward mode, and are executed on and from the track in the reverse mode when the user specifies the reverse mode.

Next, the following description will discuss a loading operation of the C-cassette 1 or the D-cassette 15 into a tape recorder.

As illustrated in FIGS. 4(a) and 4(b) as well as in FIGS. 8(a) and 8(b), the C-cassette 1 or the D-cassette 15 is loaded in the direction of the arrow F toward a cassette-receiving section 20, which is installed at a recording and reproducing station of the tape recorder and wherein a recessed portion 20a is formed. The recessed portion 20a is provided as a receiving face whereto the raised portion 10 or 11 of the C-cassette 1 is fitted. Therefore, the C-cassette 1 is fitted to the cassette-receiving section 20, whereas the D-cassette 15, which has the cassette shell 12 having a rectangular parallelepiped shape, is placed at the recessed portion 20a with a space in the vertical direction. Here, in the present embodiment, the C-cassette 1 as well as the D-cassette 15 is loaded in the direction of the arrow F toward the cassette-receiving section 20; yet, the present invention is not necessarily limited to this structure and, for example, another structure wherein the cassette is loaded in the direction of the arrow H may be adopted. Further, the cassette-receiving section 20 is installed at the recording and reproducing station of the tape recorder; yet, the present invention is not necessarily limited to this structure and, for example, it may be installed on a cassette holder, which holds the C-cassette 1 or the D-cassette 15 and guides it from its cassette-inserting station to the recording and reproducing station. Furthermore, in the present invention, positioning of the C-cassette 1 is executed by the use of the cassette-receiving section 20; yet, the present invention is not necessarily limited to this arrangement and, for example, the positioning may be executed by the use of a cassette holder or a main chassis.

Figure 5:
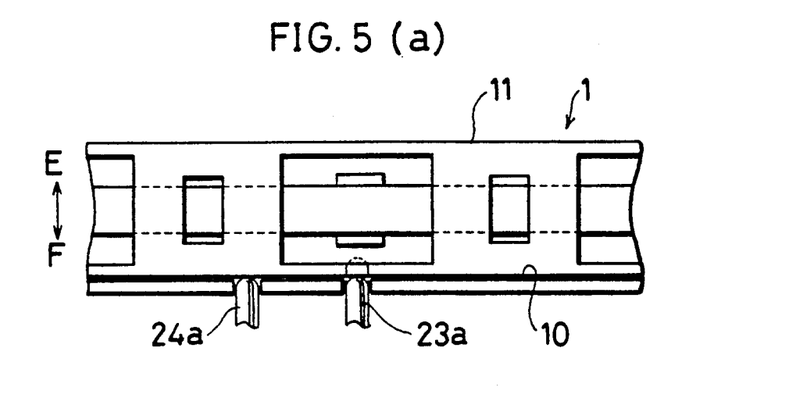
Figure 9A:
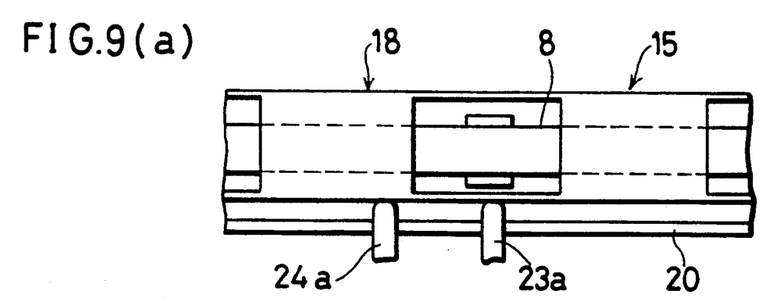
FIG. 9(a) is a front view.
Figure 9B:
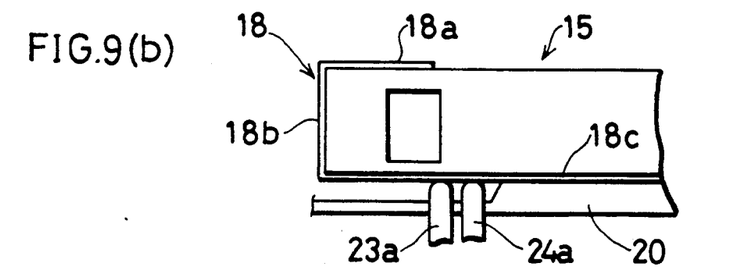
FIG. 9(b) is a right side view.

In the cassette-receiving section 20, there are provided two holes 21 and 22 through which actuators 23a and 24a of the first and second switches 23 and 24, which will be described later, are shifted upward or downward in directions indicated by arrows E-F as illustrated in FIGS. 5(a) and 5(b) as well as in FIGS. 9(a) and (b).

The first switch 23, which functions as the first cassette detection means and as a distance-material detection means, and the second switch 24, which functions as a distance-material detection means, are installed on the cassette holder or the main chassis, which are not shown.

The actuator 23a, which functions as a first contact member of the first switch 23, is installed so as to be aligned on the same axis as the machine screw 7 on the A-side 2 when the C-cassette 1 is loaded.

Further, the actuator 24a, which functions as a second contact member of the second switch 24, is installed so as to be aligned face to face with the plane area of the raised portion 10 or 11 when the C-cassette 1 is loaded. When the D-cassette 15 is loaded, the actuator 24a is aligned face to face with a plane area except the upper bent portion 18a on the plane of the slider 18 including the upper bent portion 18a.

Next, the following description will discuss the first switch 23 and the second switch 24 in detail.

Figure 10A:
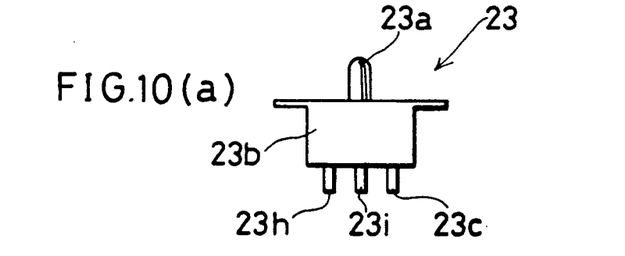
FIG. 10(a) is a side view.
Figure 10B:
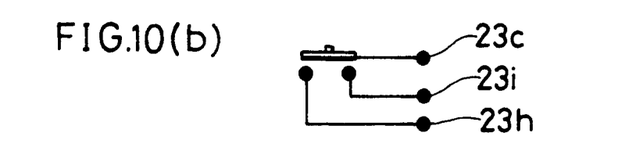
FIG. 10(b) is a circuit diagram.

As illustrated in FIGS. 10(a) and 10(b), the first switch 23 is a microswitch that is constituted of the actuator 23a, as the first contact member, and a main body 23b.

Figure 11:
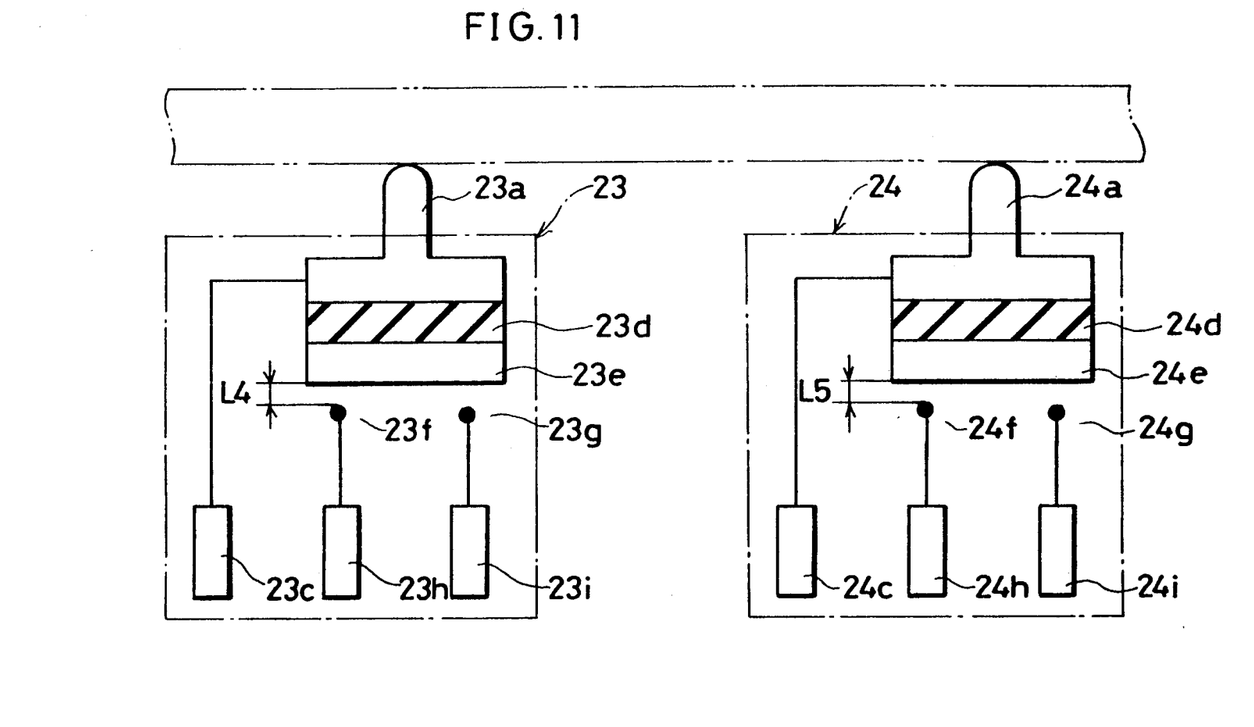
FIG. 11 is a schematic side view showing a structure of the switch for use in the cassette-detection device.

As illustrated in FIG. 11, the actuator 23a, which is made of an electrically conductive member, is connected to a terminal 23c. Here, the actuator 23a may be made electrically conductive by applying electrically conductive plating onto the surface of a non-conductive member.

Further, the actuator 23a is integrally provided with a movable contact point 23e having an insulator 23d situated in between. This movable contact point 23e is aligned face to face with fixed contact points 23f and 23g that are installed with a distance L4 and, when this distance L4 is maintained, the switch is OFF, which is defined as the initial state. Here, the horizontal plane including the fixed contact points 23f and 23g is defined as a reference plane on the detecting operation. These connected to terminals 23i and 23h, which are connected to a detection circuit, not shown, together with the terminal 23c. In the present embodiment, the second switch 24 has the same functions as those of the first switch 23; therefore, the explanation thereof is omitted.

In the detection circuit, the power source is connected between the terminals 23i and 23h of the first switch 23a, between the terminals 24i and 24h of the second switch 24a functioning as the second contact member, and between the terminal 23c of the actuator 23a and the terminal 24c of the actuator 24a, in series therewith; thus, detection signals are generated by currents flowing depending on the conductive states of these pairs of terminals: 23i and 23h; 24i and 24h; and 23c and 24c.

Next, the following description will discuss the distance L4 in the first switch 23 and the distance L5 in the second switch 24 in detail.

First, the distance L4 of the first switch 23 is set to be shorter than a moving distance of the actuator 23a that is made when the actuator 23a comes into contact with the raised portion 11 of the C-cassette 1 upon loading of the C-cassette. The distance L4 is also set to be longer than a moving distance of the actuator 23a that is made when the actuator 23a comes into contact with the D-cassette 15 upon loading of the D-cassette. As a result, when the C-cassette 1 is loaded with the A-side 2 facing up, the first switch 23 turns on; whereas when the D-cassette 15 is loaded, the first switch 23 does not turn on. Further, when the C-cassette 1 is loaded with B-side 3 facing up, the actuator 23a is not moved since the travel of the actuator 23a is limited by a stopper, not shown; thus, the first switch 23 does not turn on.

Moreover, the distance L5 of the second switch 24, which has the same value as the distance L4, is set to be shorter than a moving distance of the actuator 24a that is made when the actuator 24a comes into contact with the raised portion 10 or 11 of the C-cassette 1 upon loading of the C-cassette. The distance L5 is also set to be longer than a moving distance of the actuator 23a that is made when the actuator 24a comes into contact with the lower bent portion 18c of the slider 18 upon loading of the D-cassette 15. As a result, when the C-cassette 1 is loaded, the second switch 24 turns on; whereas when the D-cassette 15 is loaded, the first switch 23 does not turn on.

The following description will discuss detecting operation of the cassette-detection device of the present invention having the above-mentioned arrangement.

First, when the C-cassette 1 is loaded with the A-side 2 facing up (where the B-side 3 is associated with the detecting operation), the raised portion 11 comes into contact with the actuators 23a and 24a, as illustrated in FIG. 1(a). In this case, since the actuators 23a and 24a are moved further than the distances L4 and L5, the first and second switches 23 and 24 are turned on. Moreover, since the raised portion 11 of the C-cassette 1 is made of a non-conductive member, the conduction is not provided between the terminals 23c and 24c in the respective actuators 23a and 24a. By utilizing these three signals, it is detected that the C-cassette 1 is loaded with the A-side 2 facing up.

When the C-cassette 1 is loaded with the B-side 3 facing up, the raised portion 10 having the machine-screw hole 6 is associated with the detecting operation, as illustrated in FIG. 1(b). In this case, the first switch 23 maintains the distance L4; thus, the first switch 23 remains off. Further, the actuator 24a of the second switch 24 comes into contact with the raised portion 10, and is moved further than the distance L5; thus, the second switch 24 turns on. Moreover, since the raised portion 10 of the C-cassette is made of a non-conductive member, the conduction is not provided between the terminals 23c and 24c in the respective actuators 23a and 24a. By utilizing these three signals, it is detected that the C-cassette 1 is loaded with the B-side facing up. Then, in accordance with these detection results, an indication is given as to which side is facing up, the A-side 2 or the B-side 3.

Figures 1C, 1D:
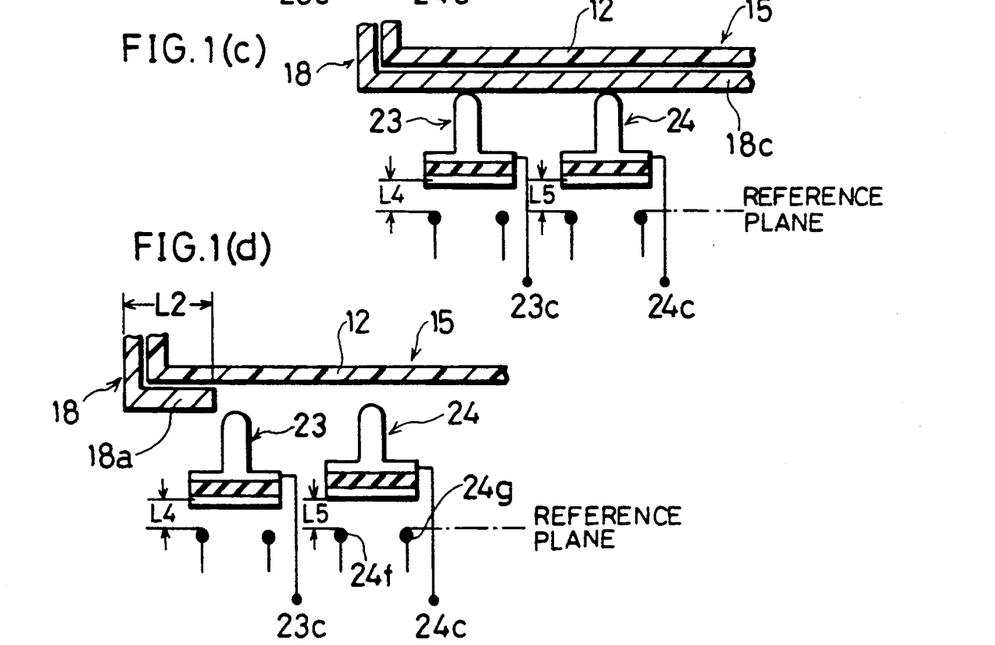
FIG. 1(c) is a sectional side view showing a state where a digital compact cassette (D-cassette) is loaded with its correct side facing up.
FIG. 1(d) is a sectional side view showing a state where the D-cassette is loaded with the wrong side facing up.

In the case of proper loading of the D-cassette 15, as illustrated FIG. 1(c), the lower bent portion 18c side of the slider 18 is associated with the detecting operation and the lower bent portion 18c comes into contact with the actuators 23a and 24a. In this case, unlike the C-cassette 1, since the actuators 23a and 24a are only moved less than the distances L4 and L5, the first and second switches 23 and 24 remain off. Moreover, since the lower bent portion 18c of the D-cassette 15 is made of an electrically conductive member, conduction is provided between the terminals 23c and 24c in the three signals, the fact that the D-cassette 15 is properly loaded is detected.

If the D-cassette 15 is improperly loaded as illustrated FIG. 1(d), the upper bent portion 18a side of the slider 18 is associated with the detecting operation. In this case, the actuator 23a of the first switch 23 comes into contact with the upper bent portion 18a, and is moved less than the distance L4; thus, the first switch 23 remains off. Further, the second switch 24 maintains the distance L5, thereby remaining off. Moreover, since the cassette shell 12 and the label at the detecting position are made of non-conductive materials, conduction is not provided between the terminals 23c and 24c in the respective actuators 23a and 24a. By utilizing these three signals, the fact that the D-cassette 15 is improperly loaded is detected. Then, an indication is given so as to show this situation.

The results of the detecting operation are shown in Table 1, wherein the combinations of the three signals are different from one another depending on their respective loaded states, and classified into four patterns.

TABLE 1

| State of Loading | Switches First | Switches Second | Conductivity between 1st Switch and 2nd Switch |
|---|---|---|---|
| C-Cassette (B-side down) | ON | ON | Non-conductive |
| C-Cassette (A-side down) | OFF | ON | Non-conductive |
| D-Cassette (Proper-loading) | OFF | OFF | Conductive |
| D-Cassette (Improper loading) | OFF | OFF | Non-conductive |

Here, the following description will discuss special cases.

One of those cases is that neither the C-cassette 1 nor the D-cassette 15 is loaded. In this case, the same signal as that generated in misloading of the D-cassette 15 is generated. More specifically, in the case of unloading, since no operation in the tape recorder is required, the signal that is used in the case of misloading of the D-cassette 15 can be utilized as a common detection signal. Here, in order to give a warning signal to the user in the case of misloading of the D-cassette 15, another switch may be provided. By actuating this switch when either the C-cassette 1 or the D-cassette 15 is loaded, judgement may be made as to whether it is misloading or unloading and a warning signal may be released.

In the cassette-detection device of the present embodiment, the detection of the D-cassette 15 is executed with the slider 18 opened; yet, the detection may be executed with the slider 18 closed. In this case, a proper arrangement is required so that the switch 24 may not be located out of the lower bent portion 18c. Additionally, FIG. 8(a) shows the slider 18 that has been opened; yet, in this state the slider 18 is not necessarily opened.

Further, the slider 18 of the present embodiment is made of an electrically conductive member. However, for example, if the slider 18 is coated with an insulator, the cassette-detection device of the present invention will detect it as improperly loaded even if the D-cassette 15 is properly loaded. In order to counteract this situation, for example, a manual switch may be provided so as to switch the signal to that indicating proper loading.

Furthermore, in the cassette-detection device of the present invention, the detection of misloading of the D-cassette 15 is intended to deal with misloading in the vertical direction; however, other cases of misloading, such as misloading in the horizontal direction and that in both of the vertical and horizontal directions, have to be considered, although those are rare cases. However, the cassette-detection device of the present embodiment can handle any of these cases since it provides signals for misloading.

As described above, in the cassette-detection device of the present embodiment for use in magnetic tape apparatuses, the switch 23 detects which side of the C-cassette 1 faces up as a performance side by sensing the presence or absence of the machine-screw hole 6 based on the difference of the distance from the reference plane that is orthogonal to the same axis as the machine-screw hole 6 of the C-cassette 1. Further, since the raised portion 10 or 11 of the C-cassette 1 and the cassette shell of the D-cassette 15 have different levels in their detection surfaces when loaded, the switch 23 gives the same detection value, OFF, when the D-cassette 15 is loaded as well as when the C-cassette 1 is loaded with the A-side facing down.

As to the D-cassette 15, the depth dimension L2 of the upper bent portion 18a of the slider 18 is shorter than the depth dimension L3 of the lower bent portion 18c. Further, the depth dimension L2 is shorter than the distance L6 that is from the front edge to the machine-screw hole 6 of the C-cassette 1. Therefore, the switch 24 detects which cassette is loaded, the C-cassette 1 or the D-cassette 15, based on the difference from the reference plane within the plane area of the raised surface 10 or 11, or on the difference from the reference plane within the plane area except the upper bent portion 18a on the plane of the slider 18 including the upper bent portion 18a. That is, the switch 24 releases an ON signal as a distance detection value for the C-cassette 1 and an OFF signal for the D-cassette 15, thereby making it possible to detect whether it is the C-cassette 1 or the D-cassette 15.

Further, the switches 23 and 24 sense non-conduction as to the plane area of the raised portion 10 or 11 of the C-cassette 1. The switches 23 and 24 also sense the difference between conductivities as to the cassette shell 12 and the slider 18 of the D-cassette 15 within the plane area except the upper bent portion 18a on the plane of the slider 18 including the upper bent portion 18a. Thus, based on the presence or absence of the conduction, the switches 23 and 24 release signals indicating conduction and non-conduction, thereby making it possible to detect the loaded state of the D-cassette 15.

Consequently, by using three types of detection signals that are obtained from only the two switches 23 and 24, four patterns of loaded states can be distinguished. Further, the wiring is simple since the switches 23 and 24 are directly installed on the base plate. Therefore, without providing a complicated structure, the device can satisfy all the three requirements: (1) the ability to detect which cassette is loaded, C-cassette or D-cassette; (2) the ability to judge which side of the cassette facing up in the case of recording or reproducing information on or from the C-cassette 1 in the automatic reversing mode; (3) the ability to prevent misloading of the D-cassette 15 and to detect a misloaded D-cassette 15.

Moreover, the switch 23 and 24 are respectively constituted of the actuator 23a and the actuator 24a. The actuator 23a is designed to come into contact with the C-cassette 1 or the D-cassette 15 on the same axis as the machine-screw hole 6 of the C-cassette 1, while the actuator 24a is designed to come into contact with the C-cassette 1 or the D-cassette 15 within the plane area of the raised surface 10 or 11 or within the plane area except the upper bent portion 18a on the plane of the slider 18 including the upper bent portion 18a. The presence or absence of conduction between the actuator 23a and the actuator 24a makes it possible to judge whether the surface that the actuators are contacting is made of an electrically conductive member or a non-conductive member.

Consequently, with these actuators having a simple structure, the loaded state of the D-cassette 15 can be detected by sensing a difference of the materials between the cassette shell 12 and the slider 18 of the D-cassette 15 with respect to its detection side.

Additionally, in the present embodiment, the cassette-detection device is employed in the tape recorder with an automatic reversing system; yet, the device is not necessarily limited to this usage, and may be employed in a tape recorder without an automatic reversing system.

Further, in the cassette-detection device of the present embodiment, in order to detect the difference of the distances from the reference surface, the actuators 23a and 24a made of microswitches that are capable of contacting the C-cassette 1 or the D-cassette 15 are employed and their moving distances (the amount of displacement) are detected. Yet, the device is not necessarily limited to this structure; for example, the detection may be made by using a laser pickup which gives a time gap between leaving time of a projected light beam and arriving time of the reflected light beam.

Furthermore, in order to detect the material of the C-cassette 1 or the D-cassette 15, electrical conductivity is utilized in the switches 23 and 24. Yet, the present device is not necessarily limited to this method; for example, the detection may be made by using a difference of light amounts between a projected light beam and the reflected light beam.

In addition, as to other methods for detecting the difference of the distances from the reference surface and the material of the cassettes, such methods utilizing sound waves, electric waves, or magnetism may be employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cassette-detection device for use in a magnetic tape apparatus, which handles either an analog cassette tape having a cartridge made of a non-conductive material with a recessed section in one side of the cartridge or a digital cassette tape having a cassette shell thinner than the cartridge with a metal slide that extends longer on one side, comprising:
   a first detection means for detecting the difference in thickness between the cartridge and the cassette shell in order to judge which cassette tape is loaded, an analog cassette tape or a digital cassette tape; and
   a second detection means for detecting the recessed section of the cartridge of an analog cassette tape in order to judge which side is up with respect to the analog cassette tape.

2. The cassette-detection device for use in a magnetic tape apparatus as set forth in claim 1, wherein:
   the first and second detection means include a first microswitch and a second microswitch respectively, the first microswitch being arranged to be depressed by one side of a cartridge in such a manner that it is turned on when an analog cassette tape is loaded, as well as being turned off when a digital cassette tape is loaded; and
   the second microswitch is arranged to be depressed by a cartridge without the recessed section and not to be depressed by a cartridge with the recessed section in such a manner that it is turned on upon loading of the cartridge without the recessed section and turned off upon loading of the cartridge with the recessed section, when an analog cassette is loaded, and that it is turned off when a digital cassette tape is loaded.

3. The cassette-detection device for use in a magnetic tape apparatus as set forth in claim 1, wherein the first and second detection means are respectively constituted of a light source for projecting a light beam onto a cartridge and a cassette shell and a light-receiving device for detecting a period of time required for the light beam to return thereto after being reflected by the cartridge and the cassette shell.

4. The cassette-detection device for use in a magnetic tape apparatus as set forth in claim 1, wherein the first and second detection means are respectively constituted of a sound source for sending a sound wave to a cartridge and a cassette shell and a sound-receiving device for detecting a period of time required for the sound wave to return thereto after being reflected by the cartridge and the cassette shell.

5. The cassette-detection device for use in a magnetic tape apparatus as set forth in claim 1, wherein the first and second detection means are respectively constituted of a radio wave source for sending a radio wave to a cartridge and a receiver for detecting a period of time required for the radio wave to return thereto after being reflected by the cartridge.

6. The cassette-detection device for use in a magnetic tape apparatus as set forth in claim 1, further comprising:
   a third detection means for detecting the presence or absence of the metal slider so as to judge whether a cassette shell is properly loaded or not in the case of loading a digital cassette tape.

7. The cassette-detection device for use in a magnetic tape apparatus as set forth in claim 6, wherein:
   the first and second detection means include a first microswitch and a second microswitch respectively, the first microswitch being arranged to be depressed by one side of a cartridge in such a manner that it is turned on when an analog cassette tape is loaded, as well as being turned off when a digital cassette tape is loaded;
   the second microswitch is arranged to be depressed by a cartridge without the recessed section and not to be depressed by a cartridge with the recessed section in such a manner that it is turned on upon loading of the cartridge without the recessed section and turned off upon loading of the cartridge with the recessed section, when an analog cassette is loaded, and that it is turned off when a digital cassette tape is loaded; and
   if the first and second microswitches are off, and if conduction is not provided between the first and second microswitches, it is judged that a digital cassette tape is loaded upside down.

8. The cassette-detection device for use in a magnetic tape apparatus as set forth in claim 6, wherein the first and second detection means are respectively constituted of a light source for projecting a light beam onto a cartridge and a light-receiving device for detecting a period of time required for the light beam to return thereto after being reflected by the cartridge.

9. The cassette-detection device for use in a magnetic tape apparatus as set forth in claim 6, wherein the first and second detection means are respectively constituted of a sound source for sending a sound wave to a cartridge and a sound-receiving device for detecting a period of time required for the sound wave to return thereto after being reflected by the cartridge.

10. The cassette-detection device for use in a magnetic tape apparatus as set forth in claim 6, wherein the first and second detection means are respectively constituted of a radio wave source for sending a radio wave to a cartridge and a receiver for detecting a period of time required for the radio wave to return thereto after being reflected by the cartridge and an intensity of the reflected radio wave.

* * * * *